United States Patent [19]

Cuzner et al.

[11] 3,849,800

[45] Nov. 19, 1974

[54] MAGNETIC DISC APPARATUS

[75] Inventors: David E. Cuzner, Romsey; Charles O. R. Dodman, Basingstoke; John S. Heath; Leonard J. Rigbey, both of Winchester, all of England

[73] Assignee: International Business Machines Corporation, Armonk, N.Y.

[22] Filed: Mar. 2, 1972

[21] Appl. No.: 231,320

[52] U.S. Cl. .................... 360/97

[51] Int. Cl. .................... G11b 17/00

[58] Field of Search .............. 340/174.1 C, 174.1 E, 340/174.1 F; 179/100.2 P, 100.2 CA; 346/74 MD, 137; 360/97

[56] References Cited

UNITED STATES PATENTS

| | | | |
|---|---|---|---|
| 3,412,386 | 11/1968 | Hendley et al | 340/174.1 C |
| 3,449,734 | 6/1969 | Frey et al. | 340/174.1 C |
| 3,478,341 | 11/1969 | Trimble | 340/174.1 C |
| 3,553,663 | 1/1971 | Scholz | 340/174.1 C |
| 3,577,133 | 5/1971 | Garfein | 340/174.1 C |
| 3,624,624 | 11/1971 | Johnson | 174/100.2 P |
| 3,631,419 | 12/1971 | Ho | 340/174.1 C |
| 3,651,501 | 3/1972 | Cote | 340/174.1 E |
| 3,710,357 | 1/1973 | Buslik | 340/174.1 C |

*Primary Examiner*—Vincent P. Canney
*Attorney, Agent, or Firm*—Nathan N. Kallman; Edward M. Suden

[57] ABSTRACT

A magnetic disc apparatus including a sealed module which encloses magnetic discs, magnetic heads attached to head arm assemblies, an electromagnetic actuator for positioning the magnetic heads on the head arm assemblies, and a drive spindle on which the discs are seated. All control of the positioning of the head arm assembly, the operation of the electromagnetic actuator and the read write function being provided by electrical signals communicated between the file housing and the sealed module. A drive motor within the file housing is coupled to the enclosed spindle, which extends from the module while maintaining the module seal, for providing only rotary motion to the discs attached to the spindle.

18 Claims, 10 Drawing Figures

MAGNETIC DISC APPARATUS

CROSS-REFERENCE TO RELATED APPLICATION

Copending patent application Ser. No. 51,867, filed July 2, 1970, in behalf of W. S. Buslik and assigned to the same assignee, discloses a magnetic disk storage apparatus employing a sealed enclosure, which contains magnetic heads attached to a head carriage, a carriage actuator, and a magnetic record disk.

Copending patent application Ser. No. 206,688, filed Dec. 10, 1971 in behalf of R. W. Lissner and R. B. Mulvany and assigned to the same assignee, discloses a magnetic disc storage apparatus employing a sealed enclosure, which contains magnetic heads attached to a head carriage, and a magnetic recording disk. An actuator with coupling means outside of said sealed enclosure is provided for coupling to the head carriage for imparting motion for positioning of the heads.

BACKGROUND OF THE INVENTION

1. Field of the Invention

This invention relates to a novel and improved disk file apparatus, utilizing a sealed interchangeable module.

2. Description of the Prior Art

Presently known magnetic disk file data storage facilities utilizing interchangeable disks or disk packs are configured in the form of a drive that includes read/write heads, head actuator means and a drive spindle. The disk pack may contain a single disk or several disks attached to a hub suitable for mounting on the drive spindle.

INTERCHANGEABLE — describes a medium (e.g., disc set) that has universal substitution without loss of data for use on all the devices it is developed to work with. To be truly interchangeable, all of the hardware elements involved in the mechanical, electronic, and magnetic implementation of storage must have sufficient repeatability, that the summation of all the deviations from perfection, for all elements, does not exceed the total variance (engineering tolerance) allowed.

The most common pack configuration presently in use is contained in a two part plastic cover assembly. The two part cover has a circular bottom panel section that is removed by the operator prior to installation of the pack on the drive spindle, and a cylindrical side section and top that is removed at the time the pack is mounted on the drive spindle. It is apparent that the removal of the pack covers exposes the pack to contamination during a loading/unloading cycle.

An alternate pack cover configuration provides for an integral cover assembly that remains with the pack. Data heads are inserted into the pack through a cover door that is opened during pack installation. The internal cover configuration provides some improved protection of the pack compared to the removal cover type. However, in both configurations, the drive data heads are exposed to contamination during the pack loading/unloading cycle.

A typical interchangeable disk pack file facility utilizes two or more data read/write heads mounted to a carriage assembly that positions the data heads over selected data track locations. These heads must be able to read any data track written on its associated disk surface in any similar file facility. Head position may be controlled by a mechanical detent acting on the head access means; or the heads may be positioned by a closed loop servo system using a servo reference and a servo position sensing transducer. Such control of head positioning relative to the data track is difficult and costly in a typical high track density, interchangeable pack file facility.

With the evolution of the magnetic disk file, increased bit and track densities and resultant increased storage capacity have been realized with increased actuator speed and access time. These improvements have required more accurate positioning of the data head relative to the disk surface. The close spacing of the head to the disk, which may now be in the order of 50 microinches, requires stringent control of the disk file apparatus to avoid head/disk damage, which may be caused by particle contamination, for example. However, the challenge remains to position uniformly all data heads controlled by the reference system to a position tolerance equivalent to a fraction of a track width. To permit pack interchangeability, all heads in all files must be similarly positioned.

Also, the achievement of increased bit density imposes requirements for more precise control of the skew alignment of the read/write head gap. Misalignment of the read head gap relative to write head gap will cause reduced signal output and bit timing shifts that may cause read errors. Control of the skew alignment of all data heads to assure error free pack interchangeability may represent a significant portion of the manufacturing cost of each data head.

Furthermore, presently known disk storage files utilizing interchangeable disk packs must provide means for the retraction and loading of the data heads relative to the pack disk surfaces. The head retract-load function adds cost to the file and increases the exposure of the disk pack to damage resulting from head-disk impact during retract or load.

In addition, when inserting another disk pack into the file, the disks are usually at a different temperature than the head assemblies. This temperature differential, which is reflected in the radial dimensions of the disks relative to the lengths of the head arms, presents problems in the "Seek Track" function, and therefore a warmup period is needed prior to recording or readout. Consequently, there is an undue loss of costly computer operating time.

SUMMARY OF THE INVENTION

An object of this invention is to provide a novel and improved magnetic disk apparatus.

Another object of this invention is to provide a magnetic disk apparatus, wherein a novel and improved removable, interchangeable disk module is provided.

A further object is to provide a disk module file apparatus wherein the requirements for manufacturing and assembly tolerances are minimized, thereby making the manufacture and assembly less expensive.

Another object is to provide a storage disk facility that does not require head retract mechanism.

Another object is to provide an interchangeable disk module which contains an electromagnetic actuator for positioning the magnetic transducer with reference to the magnetic disks.

According to this invention, a magnetic disk file apparatus incorporates an interchangeable sealed module that encloses magnetic disks; accessing head arm assemblies; an electromagnetic actuator; a drive spindle for rotating the disks; and a common frame structure to maintain alignment between the module components. When mounted to a cooperating disk file housing, the spindle is engaged by means of a pulley and belt means, by way of example, with a drive motor. The electromagnetic actuator is coupled to the file housing by means of an electrical connector. All control of the head positioning and read/write operation are communicated to the module by means of electrical signals. Each movable head assembly is, in a sense, permanently related to an associated disk surface, and has a limited path of travel angularly across the apertured disk between the outer and inner peripheries of the disk.

BRIEF DESCRIPTION OF THE DRAWINGS

The invention will be further explained by way of example with reference to the accompanying drawings, in which.

DETAILED DESCRIPTION OF THE PREFERRED EMBODIMENT

Figures 1, 2A:
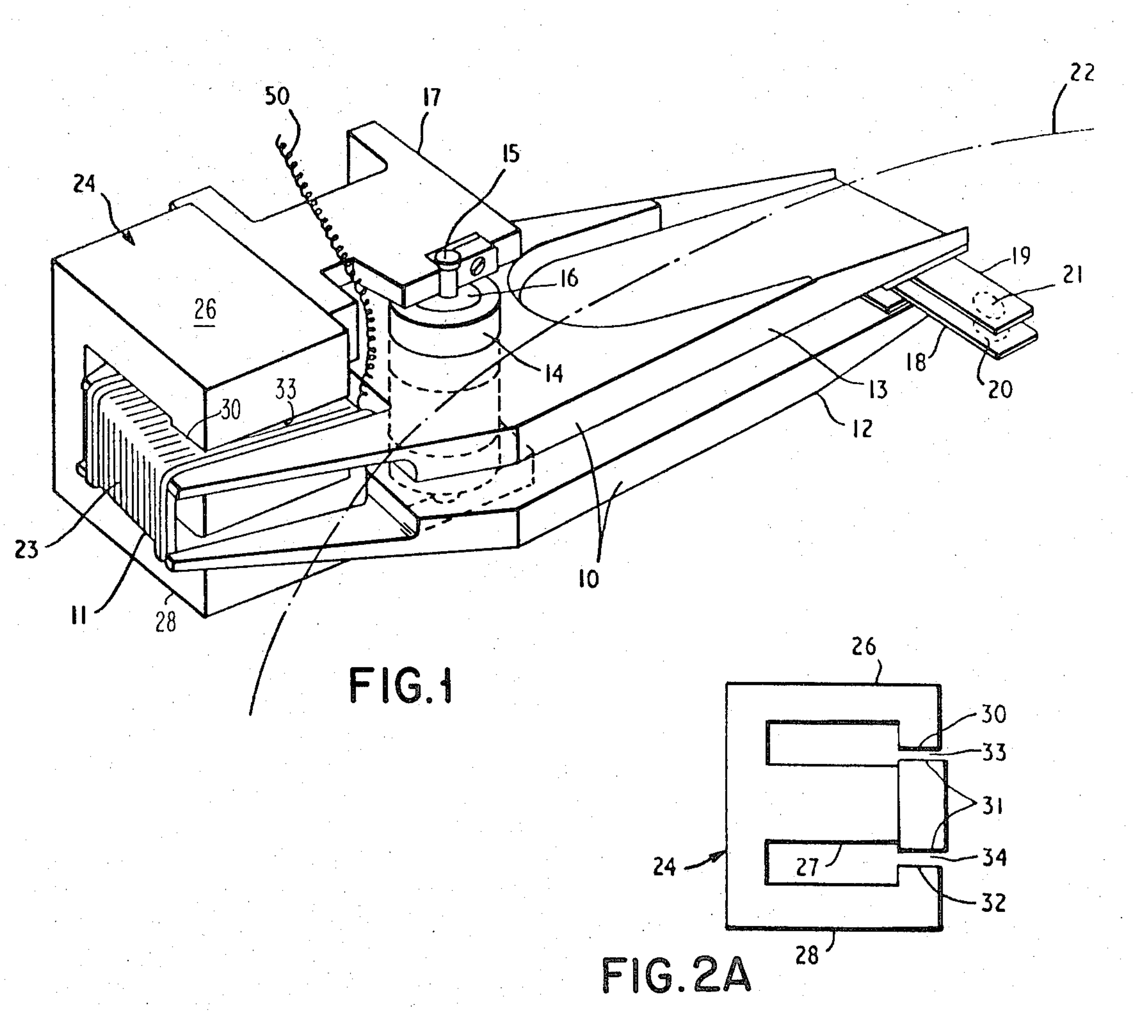
FIG. 1 is a perspective view of a positioning apparatus according to the invention.
FIGS. 2A, 2B and 2C are views of parts of the apparatus of FIG. 1.

The positioning apparatus of FIG. 1 comprises a rotatably mounted bifurcated arm 10, and an electromagnetic actuator 11 for rotating the arm. The arm 10 has two non-magnetic aluminum limbs 12, 13 which are fixed to a member 14, which in turn is rotatably mounted on a shaft 15 by a bearing 16, the shaft being carried by a fixed non-magnetic support 17. The bearing supports the arm for planar rotation about its center of gravity. The limbs 12, 13 have lateral extensions 18, 19 each carrying an electromagnetic transducing head 20, 21 and as will be explained, these heads are movable by the actuator between different radii of a rotatable magnetic disc 22 shown diagrammatically in FIG. 1, for the heads to occupy different transducing positions relative to the disc. The heads 20, 21 always remain opposite the disc, and are designed and mounted so that when the disc is stationary, the heads contact the disc, whereas when the disc is rotating at its operational speed, the heads fly on air bearings formed by boundary layers of air immediately adjacent the disc. The extensions 18, 19 are resiliently flexible to allow variation of the spacing of the heads from the disc when the disc is rotated and the heads begin to fly on the air bearings.

It will be noted from FIG. 1 that the actuator 11 is at the opposite end of the arm 10 to the heads 20, 21 and that the shaft 15 is intermediate the heads and the actuator.

The actuator 11 comprises a hollow coil 23 carried by the arm 10 and located remote from the shaft 15 so that when the arm rotates, the entire coil performs a translational movement along an arcuate path, and a stator 24 which is a permanent magnet and which is connected to the support 17. As shown in FIG. 2A, the magnet is "E"-shaped, the free ends of the arms 26, 27, 28 of the "E" being magnetic pole pieces 30, 31, 32 which define magnetic flux gaps 33, 34 therebetween. The pole pieces have flat pole faces 36, 37, 38 (FIG. 2C) which face toward each other, and the coil 23 has a rectangular former 40, two opposite sides 41, 42 of which extend parallel to the pole faces 36, 37, 38. The pole piece 31 extends inside the coil, and the pole pieces 30, 32 of opposite polarity to the pole piece 31 extend outside the coil. The dimension of the hollow interior of the former 40 between its sides 44, 45 is greater than the dimensions of the pole piece 31 in the same direction, to allow rotation of the arm and arcuate movement of the coil in the flux gaps 33, 34.

As will be seen from FIG. 1, the heads 20, 21 are disposed further from the shaft 15 than the coil 23, so that when the arm rotates, the heads move a greater distance than the coil, and mechanical magnification of the movement of the coil is obtained.

In operation, actuator signals are supplied to the coil 23 via a flexible twin cable 50 to cause current to pass therethrough, so that the coil experiences a force which causes it to move and rotate the arm 10.

Figure 2B:
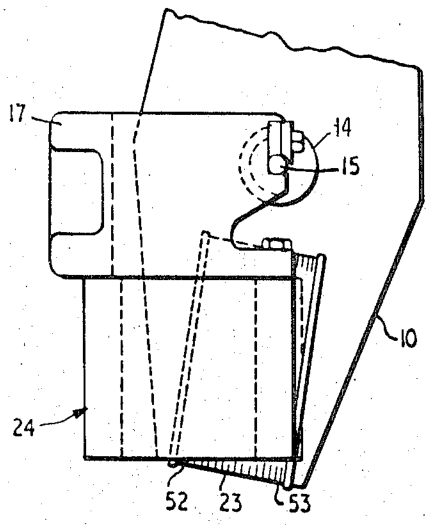
Figure 2C:
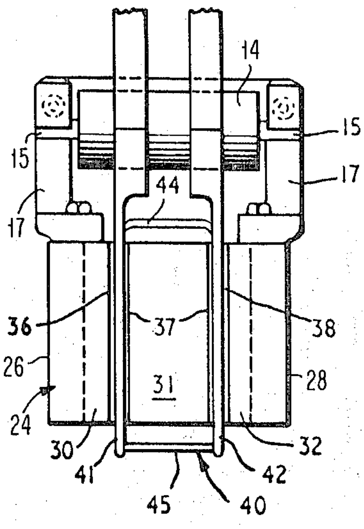

In order to improve the linearity of the characteristic of the force experienced by the coil against the current passing through the coil for different angular positions of the arm, the central arm 27 of the permanent magnet is dimensioned so that it extends outwardly from the leg of the "E" beyond the outer arms 26, 28 as shown in FIG. 2A, and the winding density of the coil is concentrated toward the outer axial ends 52, 53 thereof (FIG. 2B). Both of these techniques have regard to the fringe or leakage magnetic flux between the pole pieces 30, 31, 32, and the arms 26, 27, 28 and the optimum arrangement can be determined readily by experiment.

It will be seen that since the arm 10 is mounted for rotation about its center of gravity, the linearity of the characteristic of the force experienced by the coil against the current passing through the coil for different angular positions of the arm will be unaffected by the orientation of the shaft 15.

Figure 3:
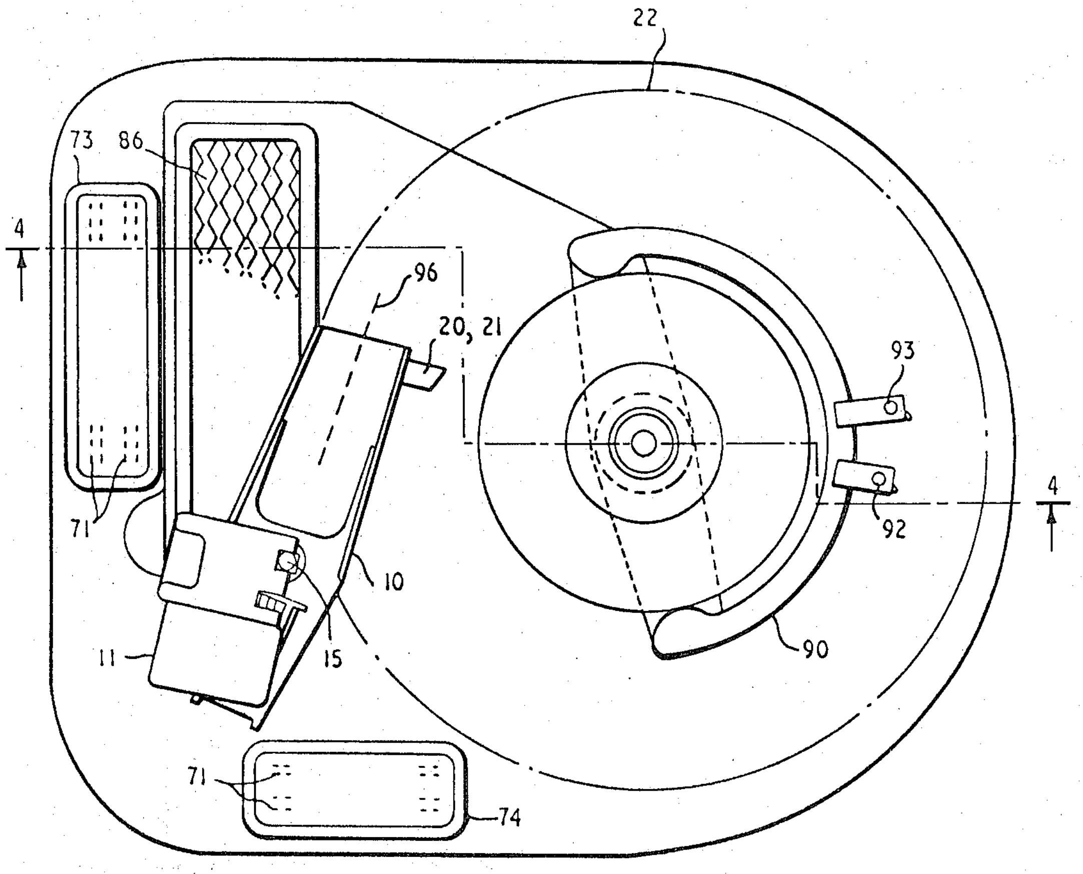
FIGS. 3 and 4 are a top view and a sectional side view of magnetic disc apparatus incorporating the apparatus of FIG. 1.
Figure 4:
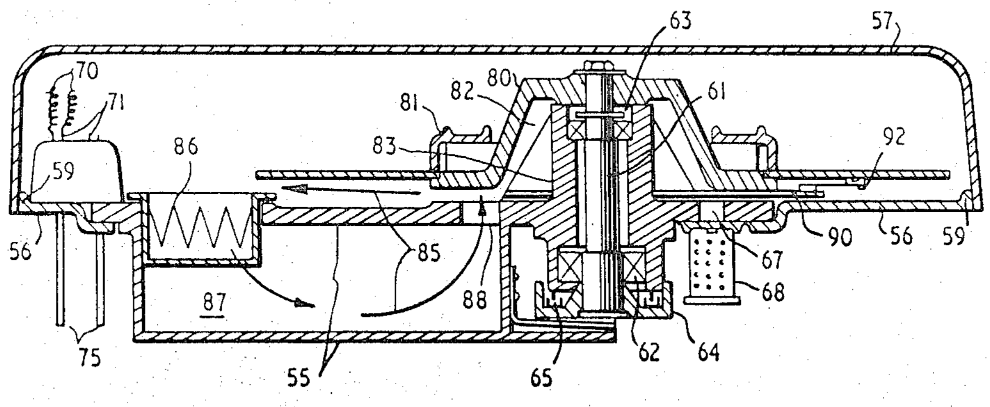

FIGS. 3 and 4 are views of magnetic disc apparatus constituted by a module incorporating the positioning apparatus of FIGS. 1, 2A, 2B, and 2C, the expression "module" being used to denote a unit which is regarded for maintenance purposes as an exchangeable or replacement item. The concept of replacement sub-assemblies is already well-known in several industries, the sub-assembly being such that when it requires maintenance, it is replaced by a new or factory-reconditioned sub-assembly, any maintenance required not being undertaken on customer's premises but being done, if at all, under precisely controlled conditions on the manufacturer's premises. Usually, and in the case of the module to be described, the arrangement is such as to prevent ready access to the internal components of the module.

The module has a single rotatable magnetic disc 22 (its position being indicated in dash line in FIG. 3), and the positioning apparatus (not shown in FIG. 4) is operable to move the heads 20, 21 between different radii of the disc and on opposite faces thereof for the heads to occupy different transducing positions relative to the disc. As the heads move inwardly of the disc, the limbs 12, 13 of the arms 10 move increasingly over the opposite faces of the disc. Over the working range of movement of the arm, the heads move along an arc which is nearly a radial line of the disc.

The disc, the arm 10 with the heads 20, 21 and the electromagnetic actuator 11 are contained together in hollow enclosing means comprising a base casting 55, a base flange 56, and a cover 57. The base flange 56 is permanently connected to the base coating 55 by a suitable adhesive such as an epoxy resin adhesive so that the connection between them is airtight. Also there is an airtight, normally fixed but releasable connection between the cover 57 and the base flange provided by a destructible seal 59 which can for example be a thermoplastic adhesive which softens on heating.

The base casting 55 rotatably supports a disc spindle 61 by bearings 62, 63, the spindle extending to the exterior of the enclosing means where it is provided with coupling means in the form of a pulley wheel 64 whereby the disc can be driven from the exterior of the enclosing means. A labyrinth seal 65 is arranged between the base casting and the pulley. Also the base casting is provided with an aperture 67 covered by an air filter 68 which prevents dust particles entering the interior of the enclosing means. Aperture 67 and labyrinth seal 65 are the only paths for air to enter the interior of the enclosing means from the exterior, and the filter 68 and seal 65 effectively prevent the entry of dust particles into the interior of the enclosing means. Thus, the enclosing means is designed to maintain a substantially particle-free atmosphere therein constantly throughout the operational life of the enclosing means and its contents considered as a unit, during which time the disc 22, the arm 10 with its head 20, 21 and the electromagnetic actuator 11 remain continuously in said atmosphere in the enclosing means. The enclosing means is initially provided with such atmosphere during assembly by ensuring that all the components are dust free, and by assembling them together in a "clean-air" room where stringent precautions are taken to eliminate and prevent entry of dust particles, the air in the room being constantly filtered and cleaned.

The heads 20, 21 and the electromagnetic actuator 11 are electrically connected by conductors 70 (only two of which are shown in FIG. 4) to terminal 71 of two signal communication means in the form of couplings 73, 74, which make airtight seals with the base flange 56 and which have printed circuit card connectors 75 on the exterior of the enclosing means to which the terminals 71 are connected, whereby ready electrical connection can be made to the heads and the actuator 11, and head signals and actuator signals can be communicated between the exterior and interior of the enclosing means.

The disc 22 is mounted on a hub 80 by a clamping ring 81, and the hub is fixed to the spindle 61, the hub being generally bell-shaped and bounding an annular region 82 between itself and a cylindrical section 83 of the base casting 55 which houses the bearing 63. When the disc is rotated in operation, there is a tendancy for the pressure in region 82 to become sub-atmospheric, so that air tends to be drawn past the seal 65 and bearings 62, 63 into the interior of the enclosing means. The air might carry contaminants, e.g. oil, from the bearings into the interior of the enclosing means, and to reduce the likelihood of this, the aperture 67 and filter 68 provide filtered air flow communication between the exterior of the enclosing means and the region 82. This region 82 is in the neighborhood of that one end of the bearing 63 which is innermost of the enclosing means, so that the air pressure neighboring that one end of the bearing 63 remains in operation substantially the same as the air pressure outside the enclosing means.

Due to the increased air pressure which exists adjacent the periphery of the disc when it is rotated, air is caused to circulate as shown by the arrows 85 through an air filter 86 mounted with an airtight seal in the base casting 55 and via a chamber 87 formed by the base casting and an aperture 88 to the vicinity of the periphery of the hub 80.

The base casting 55 carries a support 90 which supports two fixed electromagnetic transducing heads 92, 93 for cooperation in transducing relationship with the side of the disc facing the base flange 56.

In operation, the disc is driven unidirectionally in an anticlockwise sense having reference to FIG. 3. The arm 10 and the actuator 11 are so arranged that the arm, in the direction from the actuator to the heads 20, 21 extends generally opposite to the direction of rotation of the disc past the heads 20, 21.

The arm 10 is designed and arranged so that when the disc is rotated, substantially no resultant aerodynamic force arising due to air being swept off the disc because of its rotation acts on the arm tending to rotate it about shaft 15. In this embodiment, the shaft 15 is disposed close to the periphery of the disc, the limbs 12, 13 of the arm are substantially symmetrical about center line 96, shown in FIG. 3, and in the position of the arm shown where the heads 20, 21 are located at about the center tracks of the disc, the center line 96 extends in approximately the same direction as the direction of resultant air velocity affecting and passing the limbs 12, 13.

Figure 5:
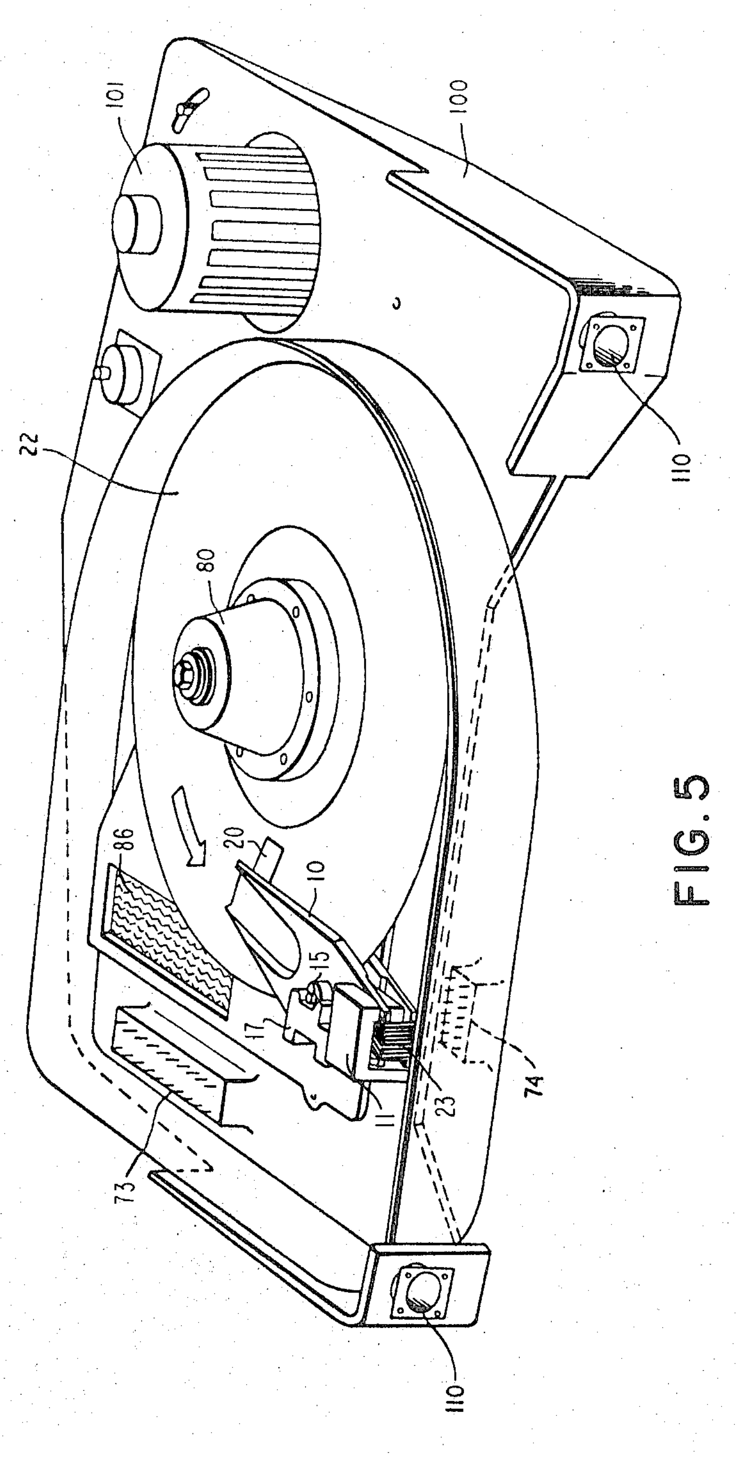
FIGS. 5 and 6 are perspective top and bottom views of the apparatus of FIGS. 3 and 4 mounted on a subframe.
Figure 6:
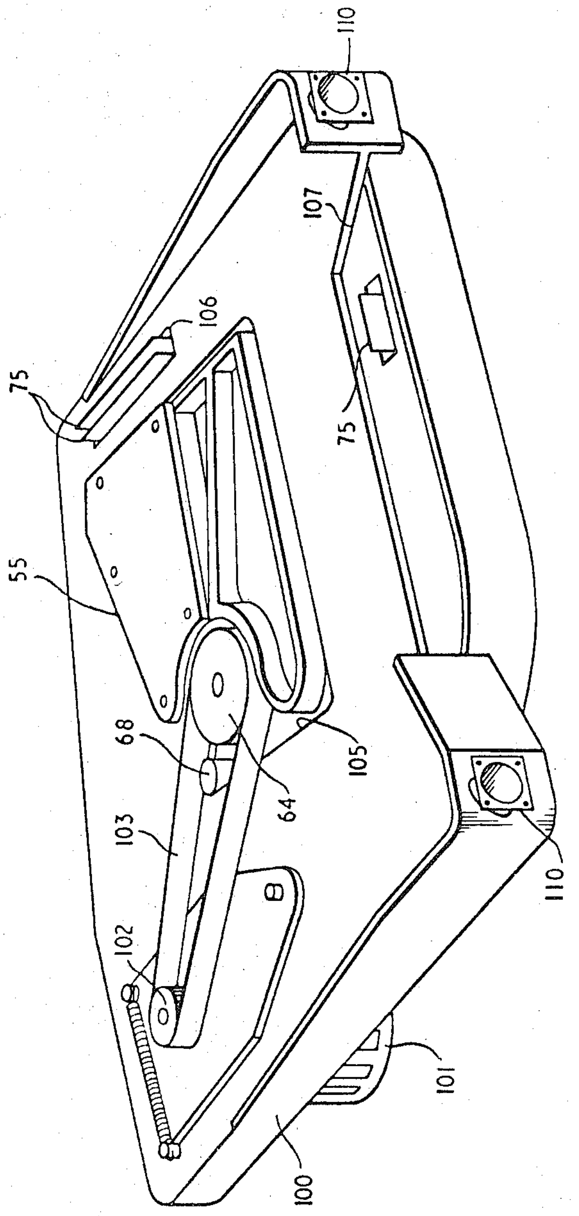

FIGS. 5 and 6 show the module of FIGS. 3 and 4 mounted on a sub-frame 100. The sub-frame carries a unidirectional electric motor 101 which is coupled by a pulley wheel 102 on the motor shaft and an endless belt 103 to the pulley wheel 64. The motor 101 is mounted so that the belt is maintained under appropriate tension. As shown in FIG. 6, the sub-frame has an aperture 105 through which the pulley wheel 64, filter 68 and part of the base casting 55 extend, and an aperture 106 and a cutaway portion 107 by which the printed circuit card connectors 75 are accessible.

Figure 7:
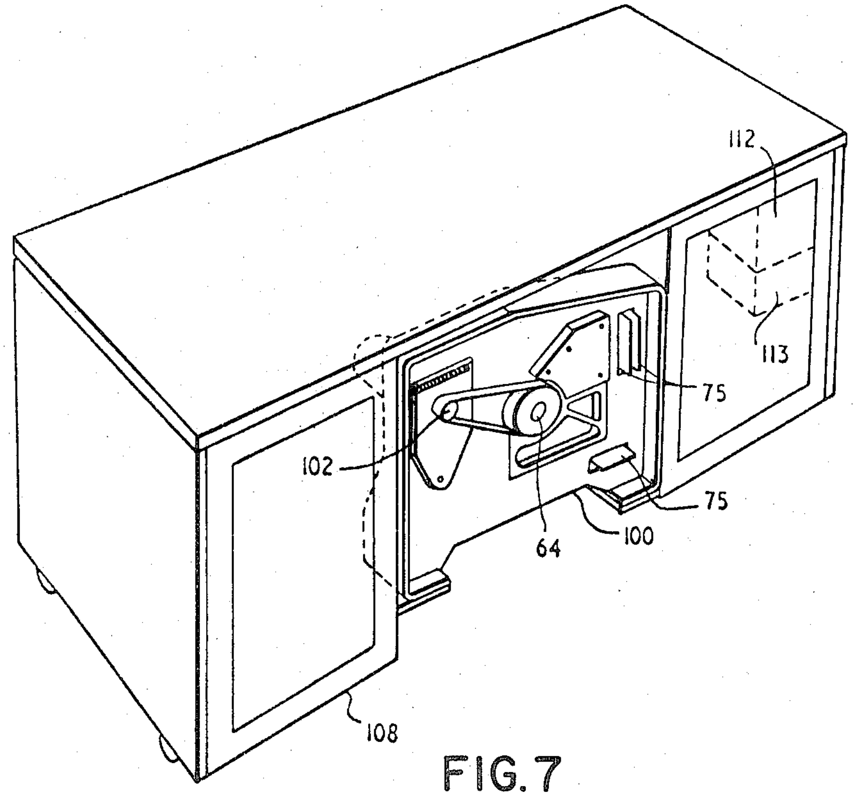
FIG. 7 shows the apparatus of FIGS. 5 and 6 mounted on a console.

FIG. 7 shows the apparatus of FIGS. 5 and 6 mounted in a recess in a console housing 108. As previously mentioned, the module is mounted on the sub-frame 100, by any conventional means (not shown). The sub-frame is in turn mounted by means of shock and vibration absorbing mountings 110 (see FIGS. 5 and 6) so that the cover 57 of the module faces inwardly of the housing behind the sub-frame. With this arrangement, removal of the module from the housing requires the sub-frame and the module first to be removed as a unit from the housing.

The housing 108 contains actuator signal generating means 112 connected by leads not shown to deliver actuator signals via the printed circuit card connectors 75 to the electromagnetic actuator 11, and head signal circuitry 113 connected by leads not shown to deliver and/or receive head signals via the connectors 75 to and/or from the heads 20, 21. Such actuator signal generating means and head signal circuitry are well-known and will not be described in detail. Basically the actuator signal generating means is responsive to disc track addresses supplied thereto to move the heads 20, 21 over said addressed tracks. In the particular embodiment illustrated, head 20 is an electromagnetic servo-track sensing head for sensing servo tracks records on one side of the disc, and head 21 is a read/write head for reading and writing data in concentric data tracks on the opposite side of the disc, there being one data track for each servo track.

As is known, the actuator signal generating means 112 includes servo control means for controlling movement of the arm 10 so that when the arm has been moved to cause the head 21 to access an addressed data track, the head 21 is caused to follow that track by signals generated in the head 20 by the servo track associated with the addressed data track, the signals in head 20 indicating any offsetting of the head 20 from the center line of the servo track which it is sensing.

Figure 8:
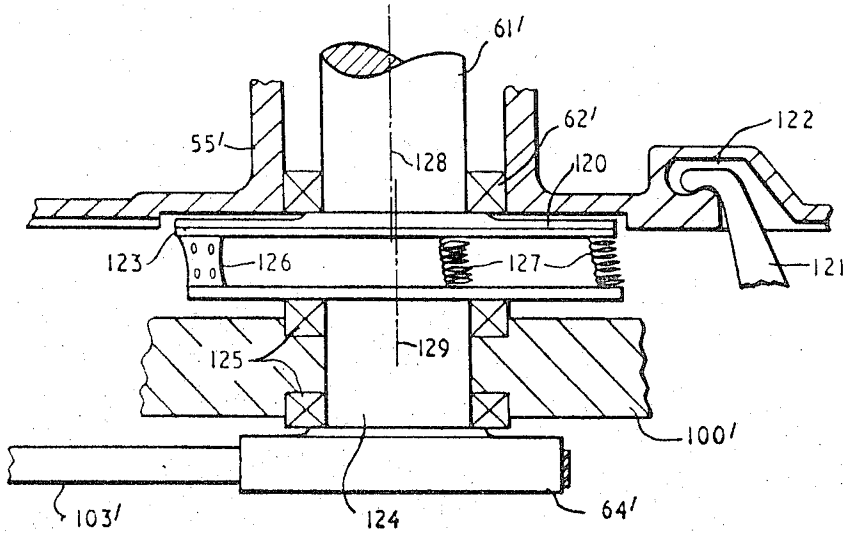
FIG. 8 shows a modification to the apparatus of FIGS. 5 and 6.

FIG. 8 illustrates a modification to the apparatus of FIGS. 3, 4, 5 and 6. In this case a base casting 55' of the module supports a disc spindle 61' in a bearing 62', the spindle 61' having a friction disc 120 fixed to its end. A subframe 100' has three equally angularly spaced actuable clamps 121 (only one of which is shown in FIG. 8) which are engageable in recesses 122 in the base casting 55' to draw the module toward the subframe 100' so that the disc 120 engages a friction disc 123 connected to a shaft 124 which is rotatable in bearings 125 supported by the subframe 100', the other end of the shaft carrying a pulley wheel 64' driven by endless belt 103'. The connection between the friction disc 123 and shaft 124 is by means of a symmetrical arrangement of rubber and spring connections 126, 127 (only three of which are shown) which are compressed when the clamps 121 are actuated. The discs 120, 123 constitute two clutch elements, the disc 123 being resiliently displaceable laterally to allow non-coaxial driving engagement between the discs as shown in FIG. 8, the axis of disc spindle 61' being shown at 128 and the axis of shaft 124 being shown at 129.

It will be appreciated that many modifications and variations may be made to the apparatus which has been described without departing from the scope of the invention as defined by the appended claims. For example, the arm 10 may be mounted on, or more accurately cantilevered from, a leaf spring support, instead of being mounted via shaft 15 and bearing 16, so that operation of the actuator 11 causes the arm to perform a composite rotational and translational movement. In the case of the apparatus of FIG. 1, such movement can be regarded as a rotation about shaft 15 and a movement of the shaft parallel to itself, so that with such a mounting, it is more accurate to say that the arm 10 is mounted for angular movement. The stator 24 can be an electromagnet instead of a permanent magnet. Also the stator 24 can be "U"-shaped rather than "E"-shaped, one leg of the "U" extending inside and the other leg of the "U" extending outside the coil 23, but this arrangement is as effective as the one described. Also, there may be a plurality of recording and/or reproducing heads on the extensions 18 and 19 of the arm 10, and the arm can comprise three or more limbs to position heads over a plurality of discs. The heads 20, 21 need not necessarily be flying heads. In addition to the two "fixed" heads 92, 93, further "fixed" heads can be provided. The actuator 11 can be located "between" the shaft 15 and heads 20, 21, so that heads move in the same direction as the coil 23.

Regarding the module which has been described, essentially it is sealed in the sense that dust particles cannot enter it. Also, it is sealed in the sense that it prevents ready access to the contents of the module, namely, the disc, the arm and the actuator. Many other means apart from adhesives can be used to prevent ready access to the interior of the module, e.g., the components of the module can be interconnected by rivets, or by means including a tag seal which has to be severed before the components can be separated or by screws the heads of which are covered by material which has to be removed before the screws can be released. There is also the possibility of using band seals of the kind which have a tag which normally engages a slot in the other end of the band to hold the band taut, release or severance of the tag allowing the band to be released.

It will be appreciated that the apparatus of FIGS. 3 and 4 can be used as a replaceable disc pack for a disc file, i.e., when it is desired to use a further disc pack without discarding the one already on the file, the one on the file is detached and the further disc pack is put in its place.

Positioning apparatus according to the invention is not exclusively applicable to adjusting electromagnetic recording and/or reproducing heads over a rotatable magnetic disc. Basically any lightweight device to be positioned can be carried by the arm, e.g., a pen inscriber for recording a visual image of an analogue signal applied to the coil 23 on a moving paper strip.

What we claim is:

1. A random access disc memory system comprising:

a plurality of interchangeable disc modules, each said module being characterized by
an enclosing means enclosing:
at least one magnetic disc rotatably mounted, at least one magnetic head associated with each side of each of said discs, an arm for carrying at least one of said magnetic heads, mounting means for supporting said arm for planar angular movement about a fixed axis where said fixed axis is at the center of gravity of said arm, and a motor connected to said arm, said motor dedicated solely for simultaneously selectively positioning one or more of said magnetic heads to any one of a plurality of concentric tracks located on said rotatable magnetic discs, said motor comprising a hollow coil carried by said arm and located so as to perform a translation movement along a curved path causing said arm to perform angular movement and a stator having magnetic pole pieces defining a magnetic flux gap therebetween and with said coil performs said translation movement, at least one of said pole pieces extending within the coil and at least one of said pole pieces extending outside the coil, so as that when current passes through said coil, magnetic flux crossing said gap will link said coil causing said coil to experience a force which causes said coil to perform said translational movement and move said arm angularly;

a housing unit for accepting any one of said disc modules, said housing unit comprising;

a first means mechanically connectable to said disc module for transmitting mechanical energy into said module only for rotating said discs within said module; and a second means electrically connectable to said disc module for controlling the operation of said motor with said module and for controlling the reading and writing of information on said discs by means of said heads.

2. A random access disc memory system as set forth in claim 1 wherein said disc, said arm with said head, and said electromagnetic actuator are contained together in said hollow enclosing means, the enclosing means having, and being designed to maintain, a substantially particle-free atmosphere therein constantly throughout the operational life of said enclosing means and its contents considered as a unit, during which time said disc, said arm with said head, and electromagnetic actuator remain continuously in said atmosphere in said enclosing means, said disc having coupling means associated therewith whereby the disc can be driven to rotate from the exterior of said enclosing means and said head and said electromagnetic actuator being operatively associated with signal communication means whereby head signals and actuator signals can be communicated between the exterior and interior of said enclosing means.

3. A random access disc memory system as set forth in claim 2 in which said disc is rotatably mounted via a spindle supported by bearing means carried by said enclosing means, said spindle extending to the exterior of said enclosing means.

4. A random access disc memory system as set forth in claim 3 wherein said arm during operation has, substantially no resultant aerodynamic force arising due to air being swept off said disc because of said disc rotation for causing said arm to tend to move said arm angularly.

5. A random access disc memory system as set forth in claim 4 wherein said discs are unidirectional driven, the positioning apparatus being so arranged that said arm, in the direction from the electromagnetic actuator to the head, extends generally opposite to the direction of motion of said discs past the heads.

6. A random access disc memory system as set forth in claim 5 wherein said discs are driven to rotate by a pulley and belt drive.

7. A random access disc memory system as set forth in claim 5 wherein said discs are driven to rotate by a clutch coupling between two clutch elements one of which is resiliently displaceable to allow non-coaxial driving engagement between the clutch elements.

8. A random access disc memory system as set forth in claim 2 wherein, said enclosing means being mounted on a sub-frame, which in turn is mounted on said housing such that removal of said enclosing means from said housing requires the sub-frame and enclosing means first to be removed as a unit from said housing.

9. A random access disc memory system as set forth in claim 8 wherein said second means includes actuator signal generating means connected to deliver said actuator signals via said signal communication means to said electromagnetic actuator, and head signal circuitry connected to deliver and/or receive said head signals via said signal communication means to and/or from said head.

10. A random access disc memory system as set forth in claim 2 further including servo-control means, for controlling movement of said arm so that said heads follow any addressed one of a plurality of concentric tracks on said discs, said servo-control means including within each said disc module servo-tracks recorded on one of said disc and an electromagnetic servo-track sensing head carried by said arm.

11. An interchangeable disc module as set forth in claim 1 wherein said arm has a section which is further from where said arm is mounted for said angular movement than said coil, causing said section to be moved a greater distance than said coil when said coil performs a translational movement within said gap of said motor.

12. An interchangeable disc module as set forth in claim 11 wherein said section of said arm carries said magnetic transducers to be positioned.

13. An interchangeable disc module as set forth in claim 12 wherein said coil of said motor is at the opposite end of said arm than said magnetic transducers, said arm being mounted for said angular movement intermediately between said magnetic transducers and said coil of said motor.

14. An interchangeable disc module as set forth in claim 1 wherein said pole pieces are constructed of permanent magnets.

15. An interchangeable disc module as set forth in claim 14 wherein the data of said motor is said "E"-shaped, the three ends of said arms of the "E" being said pole pieces, said central arm of said "E" extending inside said coil and said two outer arms extending outside said coil.

16. An interchangeable disc module as set forth in claim 15 wherein said pole pieces have flat pole faces which face towards each other and said coil has a rectangular former, said former having two opposite sides of which extend parallel to said flat pole faces.

17. An interchangeable disc module as set forth in claim 16 wherein the winding density of said coil is concentrated towards the outer axial ends thereof causing the characteristic of said force against current passing through said coil for different angular positions of said arm to be substantially linear.

18. An interchangeable disc module for use with any one of a plurality of like disc drives, said module having a first set of interfaces adapted to coact with a second set of interfaces on each of said drives, said module comprising in combination;

a base casting;

a cover connecting to said casting to form a hollow enclosing means;

a spindle assembly mounted in said base casting and having a first portion extending into said enclosing means and a second portion extending out of said enclosing means, said second portion being the first mechanical interface of said first set of interfaces;

at least one magnetic disc mounted on said first portion of said spindle for rotation with said spindle;

transducing means including at least one magnetic transducer located within said enclosing means;

a motor within said enclosing means connected to said transducing means solely for selectively positioning said transducers to different concentric tracks of said magnetic disc;

a first means connected to said transducer for controlling the transducing operations of said transducer, said first means including a portion, physically accessible outside said enclosing means, for carrying electrical signals, said portion being a first electrical interface of said first set of interfaces;

a second means connected to said motor for controlling the operation of said motor, said second means including a portion, physically accessible outside said enclosing means for carrying electrical signals, said portion being the second electrical interface of said first set of interfaces;

said first mechanical and said first and said second electrical interfaces of said first set of interfaces being in a constant fixed space relationship to each other and located in the same position in all disc modules of this type, so that disc modules will be interchangeable among a plurality of like disc drives allowing data recorded on one disc module when coacting with a first one of said disc drives to be effectively read when said data module is coacting with the same or any second one of said disc drives.

* * * * *

UNITED STATES PATENT OFFICE
CERTIFICATE OF CORRECTION

Patent No. 3,849,800 Dated November 19, 1974

Inventor(s) David E. Cuzner et al.

It is certified that error appears in the above-identified patent and that said Letters Patent are hereby corrected as shown below:

On the Title page, the following should be added:

-- [30] Foreign Application Priority Data

Mar. 13, 1971 United Kingdom------6817/71 --.

Signed and sealed this 13th day of May 1975.

(SEAL)
Attest:

RUTH C. MASON
Attesting Officer

C. MARSHALL DANN
Commissioner of Patents
and Trademarks

FORM PO-1050 (10-69)

USCOMM-DC 60376-P69
U.S. GOVERNMENT PRINTING OFFICE : 869-930